(12) United States Patent
Kazama

(10) Patent No.: US 7,964,127 B2
(45) Date of Patent: Jun. 21, 2011

(54) OPTICAL FILM, METHOD FOR PRODUCING THE SAME AND POLARIZING PLATE USING THE SAME

(75) Inventor: Kenichi Kazama, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/805,964

(22) Filed: Aug. 26, 2010

(65) Prior Publication Data

US 2010/0320627 A1      Dec. 23, 2010

Related U.S. Application Data

(63) Continuation of application No. 11/385,775, filed on Mar. 22, 2006, now abandoned.

(30) Foreign Application Priority Data

Mar. 28, 2005   (JP) .................................. 2005-092168

(51) Int. Cl.
  *D01F 11/02* (2006.01)
(52) U.S. Cl. ..................................... 264/210.5; 264/208
(58) Field of Classification Search .................. 264/208, 264/210.5; 492/46
   See application file for complete search history.

(56) References Cited

U.S. PATENT DOCUMENTS

| 6,474,402 B1 | 11/2002 | Sauer et al. |
| 2005/0003939 A1 | 1/2005 | Womer et al. |
| 2005/0077648 A1 | 4/2005 | Sugiura |
| 2005/0150426 A1 | 7/2005 | Hashimoto et al. |

FOREIGN PATENT DOCUMENTS

| JP | 5-293884 | 11/1993 |
| JP | 6-270227 | 9/1994 |
| JP | 10-10321 | 1/1998 |
| JP | 11-10728 | 1/1999 |
| JP | 2002-212312 | 7/2002 |
| JP | 2003-236915 | 8/2003 |
| JP | 2003-305765 | 10/2003 |

*Primary Examiner* — Christina Johnson
*Assistant Examiner* — Galen Hauth
(74) *Attorney, Agent, or Firm* — Finnegan, Henderson, Farabow, Garrett & Dunner, L.L.P.

(57) ABSTRACT

A method for producing an optical film comprising the steps of: (i) melt casting a cellulose ester resin or a cycloolefin resin by extruding melt of the cellulose ester resin or the cycloolefin resin from a die onto a roll-shaped cooling drum; (ii) cooling and solidifying the extruded melt to form a film; (iii) stretching the film in a lateral direction of the film; and (iv) winding the film in a roll, wherein the cooling drum has plural regions divided predeterminedly in an axis direction of the cooling drum, a temperature of each region being independently controlled.

10 Claims, 3 Drawing Sheets

OPTICAL FILM, METHOD FOR PRODUCING THE SAME AND POLARIZING PLATE USING THE SAME

This is a continuation of Application No. 11/385,775, filed Mar. 22, 2006, now abandoned, which claims the benefit, under 35 U.S.C. §119, of Japanese Patent Application No. 2005-092168, filed on Mar. 28, 2005 in Japan, each of which is incorporated herein by reference.

This application is based on Japanese Patent Application No. 2005-092168 filed on Mar. 28, 2005 in Japanese Patent Office, the entire content of which is hereby incorporated by reference.

FIELD OF THE INVENTION

The present invention relates to an optical film which can be applied for various kinds of functional film such as a polarizing plate protective film, a retardation film and a viewing angle extending film used for a liquid crystal displaying (LCD), an antireflection film for a plasma display, as well as a functional film for an organic EL display, and also relates to a method for producing such an optical film and to a polarizing plate using the optical film.

BACKGROUND OF THE INVENTION

Liquid crystal display has been widely applied as a monitor since it is space saving as well as energy saving compared to the conventional CRT display. Moreover, liquid crystal display is also becoming popular as a TV. Various kinds of optical films such as a polarization film and a retardation film are employed in such the liquid crystal display.

The polarizing plate to be used in the liquid crystal display is constituted by laminating a cellulose ester optical film as a protective film onto one or both sides of a polarizing element containing a stretched polyvinyl alcohol film. The retardation film is used for extending viewing angle or increasing image contrast, which is a film of a polycarbonate, a polymer having an alicyclic structure or a cellulose ester each provided retardation by stretching or a transparent substrate coated with a crystal liquid layer. They are also called sometimes as optical compensation film. When the slow axis of the retardation film is in the lateral direction, the production efficiency of the film is considerably improved compared with the usual batch pasting method because the retardation film can be pasted with the polarizing plate by roll-to-roll system.

It is specifically desirable that the optical films have no optical defect and have uniform retardation. Such desired conditions on the quality of optical films are becoming severer accompanied with the increase in the screen size and in resolution of the monitor or TV.

The production method of the optical film is roughly classified into a solution-casting method and a melt-casting method. The former is a method in which the polymer is dissolved in a solvent and the resultant solution is cast onto a support and the solvent is evaporated to form a film, and the film is further stretched according to necessity. This method is widely applied since the film is superior in the uniformity of the thickness. However, the method has a problem such as that the large equipment is necessary for drying the solvent. The later is a method in which the polymer is molten by heating and the melt is cast onto a support and solidified by cooling to form a film, and the film is stretched according to necessity. This method has an advantage that the equipment can be made relatively compact because the drying of solvent is not necessary, while having a disadvantage in that the obtained film is not fully satisfactory in the uniformity in the film thickness and in the retardation values.

The methods for forming the optical film by the melt-casting method are proposed in the following Patent Documents 1 through 7, for example.

Patent Document 1 discloses a method in which the molten resin film is cooled between a cooling roller having a homogeneous temperature in the lateral direction and an endless belt where the resin film is held in an arch form on the cooling roller. The document described that an optical film having a retardation of not more than 20 nm and a retardation variation of less than ±5 nm can be obtained by this method.

Patent Document 2 discloses a method in which the molten resin film is cooled by putting the film between two cooling drums. The document described that an optical film having a thickness variation of not more than 5 μm, a retardation of not more than 10 nm and a retardation variation of not more than 2 nm can be obtained by this method.

Patent Document 3 discloses a method in which molten thermoplastic resin is successively passed along the circumferences of two cooling drums each having a uniform temperature in the lateral direction. The document described that an optical film having a thickness variation of not more than 10 μm and a retardation of not more than 10 nm can be obtained.

Patent Document 4 discloses a method in which molten saturated norbornene resin is cast on a cooling drum having a diameter of from 1 m to 5 m which is held at uniform temperature in the lateral direction to form a saturated norbornene resin film having an retardation variation in the length direction of not more than 5 nm. In concrete, the document describes that the edge portion of the film can be thickened so that the film can be easily peeled off from the drum by increasing the distance between the die and the drum to 15 cm or more to reduce the width by 1 to 30%.

Patent Document 5 discloses a polymer stretching equipment having an on-line birefringence meter for measuring the birefringent property of the polymer sheet coming out from the stretching machine and a stretching controlling system for controlling the stretching ratio of the polymer by feed backing the measured birefringence values to the stretching mechanism of the stretching machine.

Patent Document 6 discloses a stretched film producing machine in which the thickness and the orientation degree of the film are independently measured and the stretching condition is controlled according to the results of the calculating operation.

Patent Document 7 discloses a T-die in which the opening at the both edge portions of the lip is larger than that at the central portion.

However, a problem is posed that, when the films (unstretched films) obtained by the methods described in Patent Documents 1 and 2 are each stretched in the lateral direction and when the film is observed under crossed nicols condition, the darkness of the observing field is not uniform and unevenness of the darkness is observed. Such the result suggests that the retardation of the stretched film is not uniform; the observing field should be uniformly dark if the retardation of the film is uniform. Moreover, a problem is posed on such the methods that the thickness distribution in the lateral direction of the stretched film cannot be controlled because the thickness profile of the film in the lateral direction is decided by the distance between the cooling roller and the endless belt or the space between the cooling drums.

A problem is also posed that the darkness of the observing field is not uniform and unevenness of the darkness is observed when the film (unstretched film) obtained by the method described in Patent Document 3 is stretched in the lateral direction and observed under crossed nicols condition. Moreover, the thickness profile of the film cannot be freely controlled by the method since the resin film is in contact with the drum at a temperature near the glass transition point (Tg) of the resin.

Regarding the method described in Patent document 4, a problem is posed that, when the distance between the cooling drum and the die is increased, undulation appears on the surface of the film in molten state, whereby flatness of the film decreases.

The methods described in Patent Documents 5 and 6 are each the method for controlling the stretching conditions and the thickness, however, the control of the retardation of the film in the lateral direction has not been fully easy.

The method described in Patent Document 7 is a method to reduce the optical distortion at the central portion of the film while the film is formed by passing through two cooling rollers, however, it has not been fully easy to improve the uniformity in thickness or in retardation of the film.

Patent Document 1: Japanese Patent Publication Open to Public Inspection (hereafter referred to as JP-A) No. 10-10321

Patent Document 2: JP-A No. 2002-212312
Patent Document 3: JP-A No. 2003-236915
Patent Document 4: JP-A No. 2003-305765
Patent Document 5: JP-A No. 5-293884
Patent Document 6: JP-A No. 11-10728
Patent Document 7: JP-A No. 6-270227

SUMMARY OF THE INVENTION

An object of the present invention is to provide a roll film for use of an optical film having a slow axis along the lateral direction of the roll film and uniform retardation in the lateral direction, a producing method of the roll film and a polarizing plate using the roll film.

One of the aspects of the present invention is a method for producing an optical film comprising the steps of: (i) melt casting a cellulose ester resin or a cycloolefin resin by extruding melt of the cellulose ester resin or the cycloolefin resin from a die onto a roll-shaped cooling drum; (ii) cooling and solidifying the extruded melt to form a film; (iii) stretching the film in a lateral direction of the film; and (iv) winding the film in a roll, wherein the cooling drum has plural regions divided predeterminedly in an axis direction of the cooling drum, a temperature of each region being independently controlled.

DESCRIPTION OF THE PREFERRED EMBODIMENTS

Figure 1:
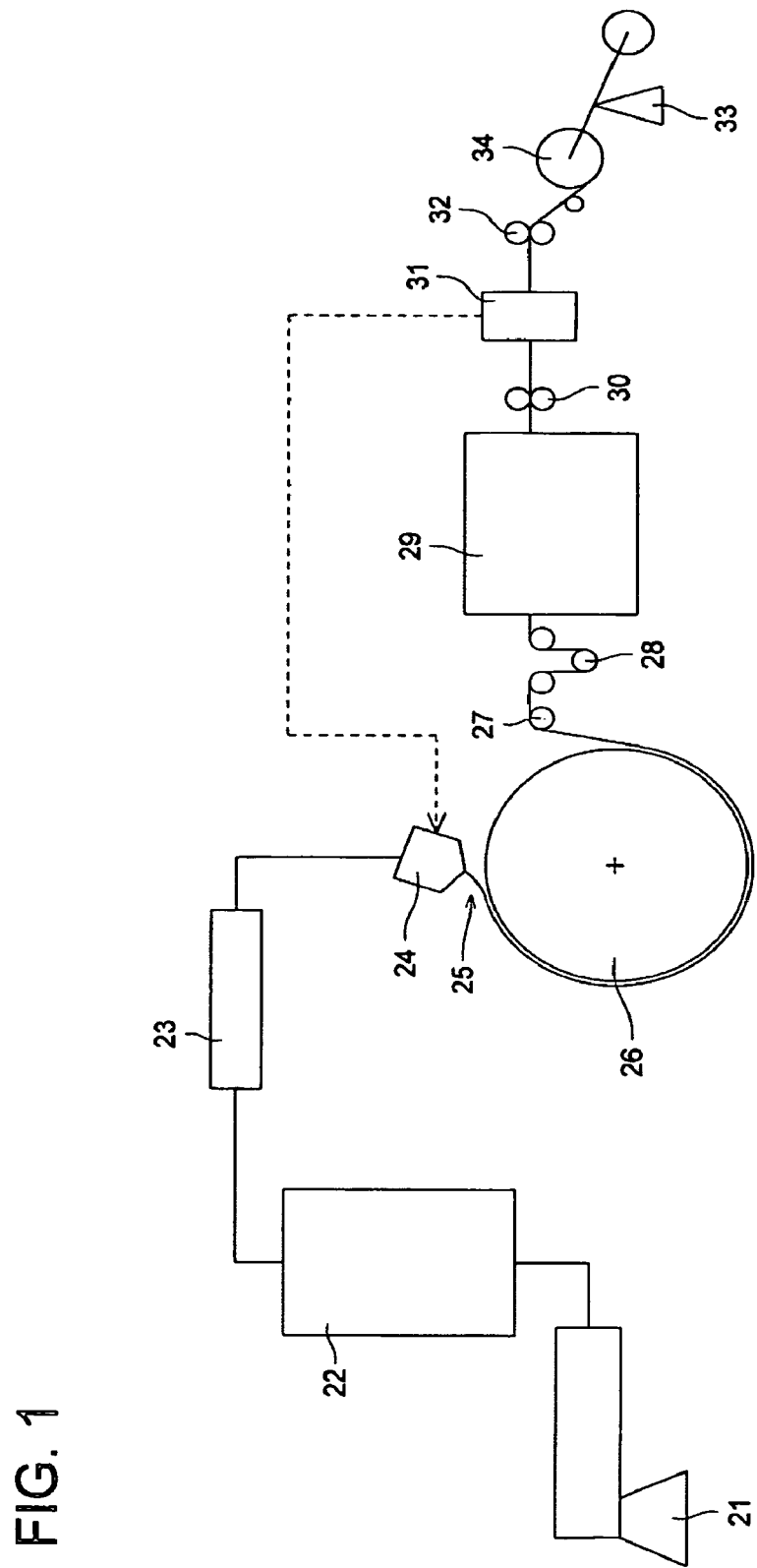
FIG. 1 shows a schematic flow sheet of the first embodiment of the optical film production method of the present invention.

In the present invention, it was found that the uniformity in the retardation value in the lateral direction (or width direction which is normal to the film conveying direction) of the optical film of the present invention, the optical film being stretched, is attained by using a roller-shaped rotary cooling drum of which temperature is controlled separately in the axis direction of the rotary drum. Herein, the axis direction of the cooling drum represents the same direction as the lateral direction of the optical film of the present invention.

The viewpoint common to the foregoing Patent Documents has been that, in a melt casting method, the fluctuation in the property of the film in the lateral direction is cause by the large difference in the viscosity of a molten resin due to the temperature variation, and the uniformity of the film in the lateral direction can be improved by keeping the temperature of the cooling drum which is in contact with the high temperature molten film wholly uniform all over the width of the drum, using one temperature control means.

However, it was found by the inventors that the unifying the drum temperature not always improves the uniformity of the property of the film in the lateral direction, and that the uniformity in the property of the film as the final product can be effectively improved by separating the temperature control of the cooling drum into plural regions in the axis direction of the cooling drum and by independently controlling the temperature in each of the regions.

The above object of the present invention is achieved by the following structures.

(1) A method for producing an optical film comprising the steps of:
   (i) melt casting a cellulose ester resin or a cycloolefin resin by extruding melt of the cellulose ester resin or the cycloolefin resin from a die onto a roll-shaped cooling drum;
   (ii) cooling and solidifying the extruded melt to form a roll film;
   (iii) stretching the roll film in the lateral direction of the roll film; and
   (iv) winding the roll film in a roll,
   wherein the cooling drum has plural regions divided predeterminedly in an axis direction on the cooling drum, a temperature of each region being independently controlled.

(2) The method of Item (1), wherein a width of the roll film is 1000 to 4000 mm.

(3) The method of Item (1) or Item (2), wherein the cellulose ester resin comprises at least one of the compounds selected from the group consisting of: cellulose acetate, cellulose propionate, cellulose butyrate, cellulose acetate propionate, cellulose acetate butyrate, cellulose acetate phthalate and cellulose phthalate.

(4) The method of any one of Items (1) to (3), wherein the cooling drum is divided into 2 to 10 regions.

(5) The method of any one of Items (1) to (4), wherein
   (a) a width of the cooling drum is 1100 to 4400 mm; and
   (b) a diameter of the cooling drum is 300 to 3500 mm.

(6) The method of any one of Items (1) to (5), wherein
   (c) a temperature difference between any adjacent regions is 5 to 30° C.; and
   (d) a temperature difference between a maximum temperature and a minimum temperature in a temperature profile of all over the cooling drum is 5 to 50° C.

(7) The method of any one of Items (1) to (6), wherein a thickness of the optical film is 40 to 120 μm.

In the method for producing the optical film of the present invention described in above Item (1), the cellulose ester resin or the cycloolefin resin is extruded through the die by the melt-casting film forming method and solidified by cooling to form an unstretched film and then, continuously, the unstretched film is stretched in the lateral direction by holding the both side edges of the film and winded up, wherein the unstretched film (web) is passed on the roller-shaped cooling drum and the temperature of the drum can be independently controlling in the lateral direction. The optical film having uniform retardation property can be produced according to the present invention.

A liquid crystal display superior in the viewing angle can be obtained by the use of the optical film produced by the method of the present invention.

The present invention described in Item (2) is characterized in that the width of the film after solidified by cooling is from 1,000 mm to 4,000 mm.

The width of the film after solidified by cooling is from 1,000 mm to 4,000 mm, and preferably from 1,500 mm to 3,000 mm. When the width of the film after solidified by cooling is not less than 1,000 mm, the effect of the present invention can be clearly obtained. When the width of the film exceeds 4,000 mm, the uniformity in the lateral direction of the retardation becomes to be difficulty maintained even when the present invention is applied. The width of the film after solidified by cooling is the width of the film on the occasion of peeling the film from the cooling drum.

Item (3) of the present invention describes that the cellulose ester resin in the optical film producing method of Item (1) or (2) is preferably a compound selected from the group consisting of cellulose acetate, cellulose propionate, cellulose butyrate, cellulose acetate propionate, cellulose acetate butyrate, cellulose acetate phthalate and cellulose phthalate. These cellulose ester resins are preferable because they have low photoelastic modulus and are superior in the optical properties.

The present invention described in Item (4) is characterized in that the cooling drum is divided into 2 to 10 regions in the axis direction on the cooling drum where a temperature of each region is independently controlled. The optical film according to the present invention has an advantage that the retardation property is uniform.

The crystal liquid display having superior viewing angle can be provided by applying such the optical film to liquid crystal display.

The present invention described in Item (5) is characterized in that the width of the cooling drum is 1100 to 4400 mm and the diameter of the cooling drum is 300 to 3500 mm.

The present invention described in Item (6) is characterized in that the temperature difference between any adjacent regions is 5 to 30° C. and that the temperature difference between a maximum temperature and a minimum temperature in a temperature profile of all over the cooling drum is 5 to 50° C.

The present invention described in Item (7) is characterized in that the thickness of the optical film is 40 to 120 μm.

The best embodiment for carrying out the present invention is described in detail below referring the drawings, but the present invention is not limited to the embodiment.

The present invention relates to the method for producing the optical film which can be applied for the polarizing plate protective film of the liquid crystal display (LCD).

The present invention is the method for producing the optical film by the melt-casting method comprising the steps of extruding the cellulose ester resin or the cycloolefin resin through the melt-casting die, solidifying the resin by cooling to form the unstretched film, continuously stretching the film in the lateral direction by holding the both side edges of the unstretched film and winding up the stretched film, in which the solidifying by cooling step is carried out by a roller-shaped cooling drum capable of controlling the temperature thereof independently in the lateral direction for improving the uniformity of the retardation of the optical film after stretching.

The method in which thermoplastic resin is molten and extruded through a die and solidified on a cooling drum is called a melt-casting method. The melt-casting method includes a method using a die, a melt-extrusion method such as an inflation method, a calender method, a heat-press method and an injection method. In the present invention the method using the die is applied, by which the thickness ununiformity of the film can be reduced, the film having a thickness of from 50 to 500 μm is easily produced and the retardation ununiformity can be made small.

FIG. 1 shows a schematic flow sheet of the first embodiment of the apparatus for carrying out the optical film producing method of the present invention.

In the apparatus of the drawing, melt-extrusion conditions can be applied, which are similar to those for another thermoplastic resin such as polyester. For example, a thermoplastic resin dried by hot air, under vacuum or reduced pressure is molten at an extruding temperature of approximately from 200 to 300° C. by a single- or double-axis extrusion machine 21, filtered by a leaf-disc type filter 22 for removing foreign materials, cast through a T-die 24 into a form of film and solidified on a cooling drum 26. The charging of the plastic into the extrusion machine 21 from the hopper is preferably carried out under atmosphere of vacuum, reduced pressure or inactive gas for preventing the oxidation or decomposition of the plastic.

The flowing amount of the plastic for extruding is preferably stabilized by using a gear pump. Sintered stainless steel fiber filter is preferably employed for the filteration for removing the foreign materials. The sintered stainless steel fiber filter is a filter prepared by pressing stainless steel fibers in a state of entwined with together and sintered the contacting points to form a unified block. The filtering precision of the filter can be controlled by varying the density thereof according to the thickness and the compressing amount of the fiber. A multi-layered filter is preferable in which sparse and dense filtering layers are alternatively piled continuously for several times. A filter in which the filtering precision is gradually raised or the layers of sparse and dense filtering precision are alternatively repeated is preferable because the filtering life time can be prolonged and the capturing ability of the filter to the foreign materials and gelled substance can be raised by such the constitution.

In the melt-casting film forming method, a line-shaped defect tens to occur when damage is formed or a foreign matter adheres on the T-die 24. Such the defect is called a die-line. It is preferable for reducing defects such as the die-line that the structure of the piping from the extrusion machine 21 to the die 24 is designed so as to reduce the portion where the resin tends to be stay as few as possible. It is also preferable to use the die 24 having few damage at inside or the lip thereof. The atmosphere containing a volatile component is preferably sucked out since the volatile component from the resin is deposited around the die 24 and causes the die-line some times. The volatile component is deposited some times onto an apparatus such as a static potential applying apparatus. Therefore, the deposition is preferably prevented by applying alternative current or heating.

An additive such as a plasticizer may be previously mixed with the resin or kneaded with the resin in the extrusion machine 24 in the course of extrusion. A mixing means such as a static mixer 23 is preferably applied for uniformly mixing.

Figure 3:
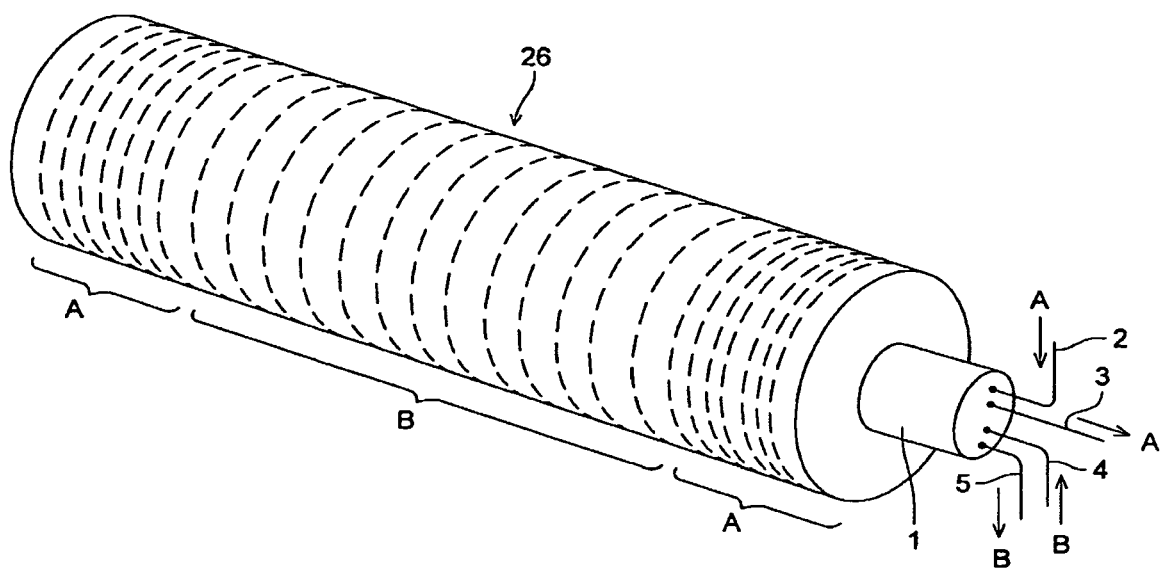
FIG. 3 shows in detail an enlarged oblique view of roll-shaped cooling drum to be used in the apparatus for implementing the optical film production method of the present invention.

FIG. 3 shows an enlarged oblique view of the roller-shaped cooling drum 26 to be employed in the apparatus of FIG. 1 for carrying out the optical film producing method of the present invention.

In the drawing, the temperature of the cooling drum 26 can be independently controlled in the lateral direction. The temperature is usually controlled by running a heating medium such as water and oil in the cooling drum 26. The running course of the heating medium is divided some regions in the lateral direction in the roller-shaped cooling drum 26.

The term of "the temperature can be independently controlled in the lateral direction" means that the roller-shaped drum is divided into necessary zones in the lateral direction so that the temperature can be independently controlled in each of the zones. The number of the zone is preferably from 2 to 10 from the viewpoint of complication of the apparatus. The uniformity of the film having a width of from 1,000 mm to 4,000 mm can be improved by dividing into 2 to 5 zones. In the example shown in FIG. 3, the drum is divided into three zones, two of Zone A and one of Zone B and the temperature is controlled independently in each of these zones.

Namely, pipes for running the heating media are installed in the cooling drum 26. In the apparatus shown in the drawing, a pipe 2 for inletting a first heating medium and a pipe 3 for out letting the first medium (System A) are connected to an end of the pivot of the drum, and a pipe 4 for inletting a second heating medium and a pipe 5 for out letting the second heating medium (System B) are connected to the end of the pivot 1 so as to divide two systems. The surface temperature of the cooling drum 26 can be independently controlled by running two kinds of heating medium different in the temperature or the heat capacity from each other. In this embodiment, the cooling drum 26 is divided into System A, 1/5 region from each of the both side edges of the drum, and System B at the central portion, and the systems can be independently controlled in the temperature, for example, the edge regions of System A are held at 40° C. and the central portion of System B is held at 30° C. for cooling and solidifying the resin to forth the unstretched resin film.

The application of the present invention is advantageous compared with the method by unifying the temperature in the lateral direction.

In the present invention, the number of the roller-shaped cooling drum 26 may be one or plural. The number of the roller-shaped cooling drum capable of independently controlling the temperature in the lateral direction also may be one or plural. The diameter of the cooling drum is preferably from 1,100 mm to 4,400 mm in the width and from 300 mm to 3,500 mm.

The temperature of the cooling drum 26 is preferably within the range of from room temperature to the glass transition point Tg of the resin.

In the present invention, the ununiformity of the retardation can be inhibited by passing the unstretched film (web) on the roller-shaped cooling drum capable of being controlled independently in the lateral direction in which difference of the temperature at the central portion and that at each of the edge portions are different from each other within such the range. Thus the optical film having uniform retardation property can be produced.

Figure 2:
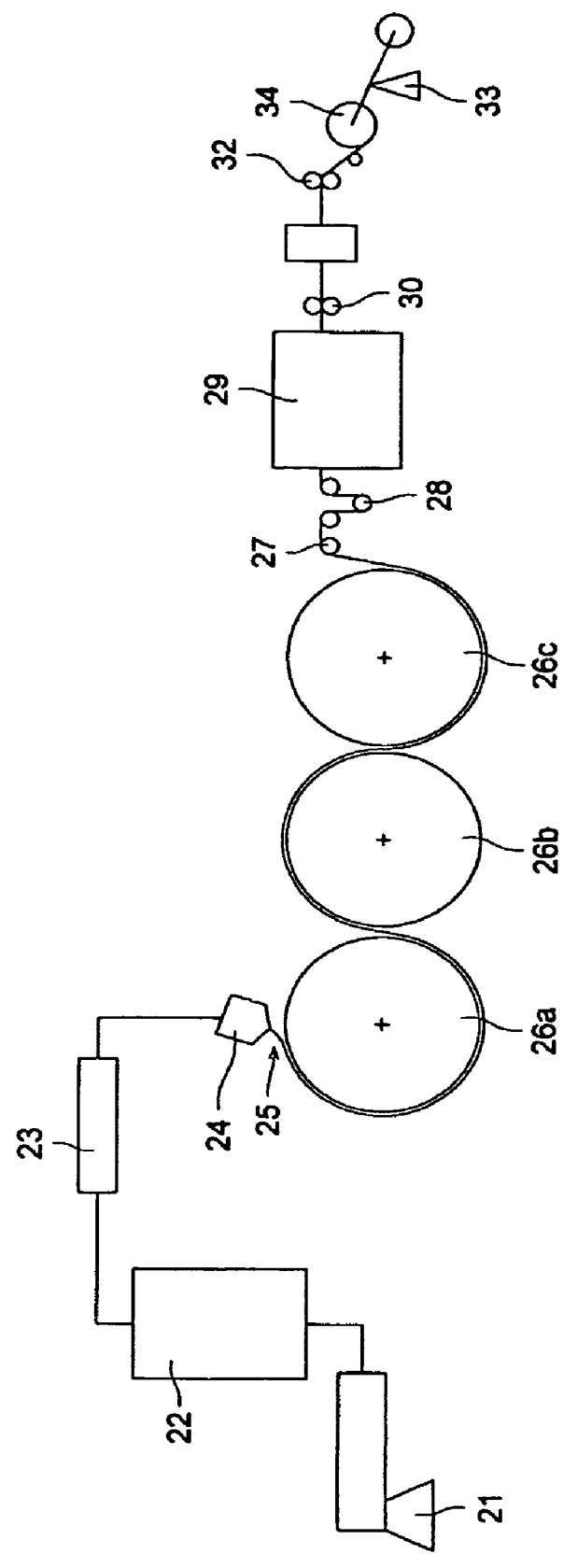
FIG. 2 shows a schematic flow sheet of the second embodiment of the optical film production method of the present invention.

FIG. 2 shows a schematic flow sheet of the second embodiment of the apparatus for carrying out the optical film producing method of the present invention.

In the apparatus of FIG. 2, the three roller-shaped cooling drums 26 are employed and the cellulose ester resin or the syclolefin resin in molten state is cast through a T-die 24 into a film and cooled and solidified by successively contacting to a first cooling drum 26a, second cooling drum 26b and third cooling drum 26c to obtain an unstretched cellulose ester resin film or cycloolefin film. In the present invention, at least one of the cooling drums 26a through 26c is the drum capable of being controlling independently in the lateral direction in which the temperature at the central portion and that at each of the edge portions are different from each other within such the range, and the unstretched film (web) is passed on the drums. Thus the ununiformity after the stretching can be inhibited and the optical film having uniform retardation property can be obtained.

In the present invention, the temperature difference between the adjacent portions is preferably from 3° C. to 30° C., and the entire difference is preferably from 5° C. to 50° C.

The second embodiment is the same as the first embodiment on another point; therefore, the same signs are applied to the same parts in the drawings.

For contacting the resin film to the cooling drum, a method by applying static electricity, a method by wind pressure, a method by nipping at the edge portions or entire width or a method by reducing pressure can be applied.

The thermoplastic resin film produced by the optical film producing method of the present invention utilizing the melt-casting method has a peculiarity that the retardation in the thickness direction Rt is small, and the retardation in the face direction Ro can be easily actualized by stretching such the thermoplastic film. Moreover, the optical film can be stably produced with small dangerousness because large expanding ratio is not necessary for the foregoing film.

The cooled and solidified film (web) is peeled off from the cooling drum by a peeling roller 27 conducted into a stretching machine 29 through a dancer roller (a film tension controlling roller), and stretched in the lateral direction in the stretching machine. The molecules in the film are oriented by the stretching. For stretching the film in the lateral direction, a know method such as that using a tenter is preferably applied. It is particularly preferable to stretch the film in the lateral direction because the lamination with polarizing film can be performed in a rolled state. The slow axis of the optical film composed of the thermoplastic resin is formed in the lateral direction by the stretching also in such the lateral direction. The slow axis of the polarization film is usually formed in the lateral direction. The displaying contrast of the liquid crystal display can be raised and suitable viewing angle can be obtained by building in the polarizing plate constituted by laminating the polarization film and the optical film so that the permeation axis of the polarizing film and the slow axis of the optical film are in parallel.

With respect to the stretching conditions in the stretching machine 29, the temperature and the expanding ratio can be selected so as to obtain desired retardation characteristics. The expanding ratio is usually from 1.1 to 2.0 times and preferably from 1.2 to 1.5. The stretching temperature is usually within the range of from Tg to Tg+50° C. and preferably from Tg to Tg+40° C., wherein Tg is the glass transition temperature of the resin constituting the film. When the expanding ratio is too low, desired retardation cannot be obtained sometimes, and the film is broken in some cases when the ratio is too high. Excessively low temperature frequently causes breaking of the film, and excessively high temperature causes insufficient in the retardation in some cases.

The stretching in the lateral direction of the film is preferably carried out under a uniformly controlled temperature distribution. The difference in the temperature is preferably not more than ±2° C., more preferably not more than ±1° C., and particularly preferably not more than ±0.5° C.

The thermoplastic resin film produced by the foregoing method may be stretched or shrunk in the length or lateral direction for controlling the retardation or reducing the dimensional variation. A method in which the film is temporary released from the clips in the course of stretching in the lateral direction for slacking the film in the length direction and a method in which the space between the adjacent clips of the lateral direction stretching machine is gradually narrowed to shrink the film are applicable for shrinking the film in the length direction. The later method can be carried out by a method in which a usual two-axis stretching machine is used and the space between the clips adjacent in the length direction is smoothly and gradually controlled by driving the clips by a pantograph system or a linear driving system. Stretching in an optional direction (oblique direction) may be applied in combination according to necessity. The dimensional variation ratio of the film can be reduced by shrinking the film in a ratio of from 0.5% to 10% in the length and the lateral direction.

The thickness of the finished optical film to be employed in the present invention is from 30 to 200 μm, and that in the new trend thin film is preferably from 40 to 120 μm, and particularly preferably from 40 to 100 μm, though the thickness may be varied according to the objective use. The average thickness of the film can be controlled so as to make the desired value by controlling the flow amount for extrusion, the slit size of the casting mouth of the die 24 and the rotation speed of the cooling drum 26.

The stretched film is slit into the width of the product by a slitter 30 before winding up.

In the present invention, the thickness of the stretched film is measured by a thickness detecting means 31 and the measured results are fed back to a thickness controlling means, not shown in the drawing, arranged in the lateral direction of the die 24 to control the thickness so as to unify the thickness. By applying such the apparatus, the thickness distribution of the unstretched film can be controlled in real time while monitoring the thickness of the film after stretching, thus the optical film can be obtained.

Knurling treatment (embossing treatment) may be applied onto the both edges by a knurling machine 32 having an embossing roller and a back roller for preventing occurrence of adhesion or scratches in the optical film roll which is winded up after slitting into the product width by the slitter 30. The knurling treatment can be carried out by heating or pressing the film by a ring having a pressing pattern on the circumference side thereof. The both side edges portion of the film where have been held by the clips are slit off and reused as the raw material since this portions are deformed and usually unusable for the product.

In the above drawings, 25 represents a film contacting means and 28 represents a dancer roller.

In thus obtained stretched thermoplastic film, the molecules are oriented by the stretching so that the film has certain degree of retardation in the lateral direction. Usually the retardation of the film in the face direction Ro is from 20 to 200 nm and that in the thickness direction Rt is from 90 to 400 nm. And the retardation in the face direction Ro of from 20 to 100 nm and that in the thickness direction Rt of from 90 to 200 nm are preferable. The ratio of Rt to Ro, Rt/Ro, is preferably from 0.5 to 2.5 and particularly preferably from 1.0 to 2.0.

When the refractive index in the slow axis of the film is Nx, that in the fast axis of the film is Ny, that in the thickness direction is Nz and the thickness of the film is d (nm), Ro and Rt are each expressed by the following expression:

$$Ro=(Nx-Ny)\times d$$

$$Rt=\{(Nx+Ny)/2-Nz\}\times d.$$

The scatter of the retardation is preferably smaller and usually not more than 15 nm, preferably not more than 10 nm and more preferably not more than 4 nm.

The uniformity of the direction of the slow axis is also important and the angel with the lateral direction of the film is preferably within the range from −5 to +5°, more preferably from −1 to +1°, and particularly preferably from −0.5 to +0.5°.

The thermoplastic resin to be used for producing the optical film of the present invention is not specifically limited as long as the resin can be formed into the film by the melt-casting method. Examples of the resin include polycarbonate resin, cycloolefin type resin, poly(vinyl alcohol), polyamide, polyimide and cellulose ester. Among them the cellulose ester and the cycloolefin resin are preferable since they have low photoelasticity.

The cellulose ester is superior in the adhesiveness with the stretched poly(vinyl alcohol) of the polarization element. The characteristics of the cycloolefin resin are high humidity resistivity and low dimensional variation.

As the cellulose ester, cellulose acetate propionate, cellulose acetate butyrate and cellulose acetate propionate butyrate are preferable. The substituting ratio of acyl group in the cellulose ester is preferably not less than 1.5 because the film using such the cellulose ester is superior in the dimension stability thereof.

The acyl substituting degree of the cellulose ester can be carried out according to ASTM D-187-91. The number average molecular weight of from 50,000 to 300,000, particularly from 60,000 to 200,000, is preferable because the mechanical strength can be raised by the use of such the resin.

The cycloolefin resin is a polymer having an alicyclic structure in the repeating unit thereof and the alicyclic group may be positioned at any of the main chain and the side chain. Alicyclic structure includes a cycloalkane structure and a cycloalkene structure, and the cycloalkene structure is preferable which is superior in the thermal stability.

The cycloolefin type resin can be obtained by polymerizing a monomer such as a monomer having a norbornene ring structure, a monocyclic olefin, a cyclic conjugated diene, an aromatic vinyl compound and a alicyclic vinyl compound by a known polymerization method such as metathesis open ring polymerization and addition polymerization and, according to necessity, the unsaturated carbon-carbon bond is hydrogenated.

The cycloolefin type resin to be employed in the present invention preferably has a weight average molecular-weight Mw of from 25,000 to 50,000, and more preferably from 30,000 to 45,000. The weight average molecular weight is measured by gel permeation chromatography and expressed in terms of polystyrene.

The molecular weight distribution (Mw/Mn) in the cycloolefin type resin is preferably from 1.2 to 3.5 and more preferably from 1.5 to 3.0. The glass transition temperature Tg of the cycloolefin type resin is preferably from 80 to 170° C. Suitable heat resistivity and the forming suitability can be obtained by the use of the cycloolefin resin having the properties within the above ranges.

In the present invention, an additive such as a plasticizer, a UV absorbent, an antioxidant, a matting agent, an antistatic agent, a flame retardant, a dye and oil can be added for various purposes to the thermoplastic resin as the principal material of the optical film.

Examples of the plasticizer include a phosphate type plasticizer such as triphenyl phosphate, tricresyl phosphate, cresyl diphenyl phosphate, octyl diphenyl phosphate, diphenyl biphenyl phosphate, trioctyl phosphate, tributyl phosphate, trinaphthyl phosphate, trixylyl phosphate, an arylene-bis(diaryl phosphate) ester and tricresyl phosphate, a phthalate type plasticizer such as dithyl phthalate, dibutyl phthalate, dimethoxyethyl phthalate, dimethyl phthalate, dioctyl phthalate, dibutyl phthalate and 2-ethylhexyl phthalate, a glycolate type plasticizer such as triacetine, tributyline, butyl phthalyl butyl glycolate, ethyl phthalyl ethyl glycolate, methyl phthalyl ethyl glycolate and butyl phthalyl butyl glycolate, a citrate type plasticizer such as tributyl acetylcitrate, a polyol ester type plasticizer such as dipropylene glycol benzoate, tripropylene glycol dibenzoate, 1,3-dibutylene glycol dibenzoate, tetraethylene glycol dibenzoate, trimethylolpropane triacetate and trimethylolpropane tribenzoate, and tris(2-ethylhexyl) trimeritate. Two or more kinds of the plasticizer may be employed in combination according to necessity. The adding amount of the plasticizer is preferably from 1 to 30% by weight from the viewpoint of compatibility of the effect and the bleed out of the plasticizer.

Polyester ether, polyester urethane and polyester can be preferably employed since the plasticity can also be improved by blending them.

A polyester ether is preferable, which is constituted by an aromatic or an alicyclic carboxylic acid each having 8 to 12 carbon atoms such as terephthalic acid, isophthalic acid, naphthalene dicarboxylic acid and 1,4-cyclohexane dicarboxylic acid, an aliphatic glycol or a alicyclic glycol each having 2 to 10 carbon atoms such as ethylenediol, propylene diol, 1,4-butanediol, neopentyl glycol, 1,6-hexanediol, 1,4-cyclohexanedimethanol and 1,5-pentanediol, and a polyether glycol having 2 to 4 carbon atoms to be inserted between the ether units such as poly(tetramethylene ether glycol) particularly a copolyesterether containing 1,4-cyclohexanedicarboxylic acid, 1,4-cyclohexanedimethanol and polytetramethyleneether glycol. Preferable adding amount of the polyester ether is 5 to 30% by weight of the principal thermoplastic resin. The film having suitable plasticity can be obtained by the adding amount within the above range.

As the polyester-urethane, a polyester-urethane obtained by reaction of polyester with diisocyanate can be cited. Such the compounds have the following repeating unit.

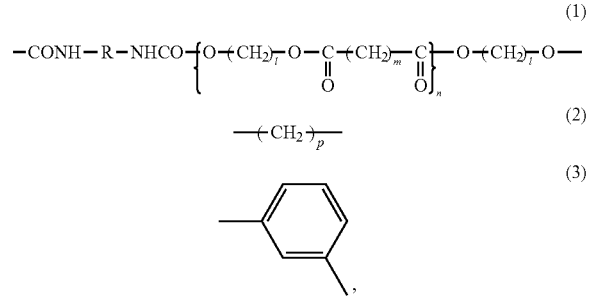

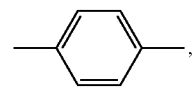

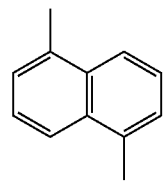

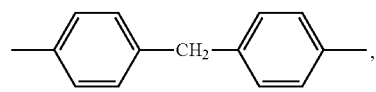

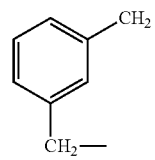

In Formula 1, 1 is 1, 2, 3 or 4, m is 2, 3 or 4, and n is an integer of from 1 to 100. R is anyone of the repeating units represented by the structural unit formulas 2 through 7. In structural unit 2, p is an integer of from 2 to 8.

In Formula 2, p is an integer of from 2 to 8.

The polyester constituting the polyester-urethane is a polyester which is constituted by the glycol component of ethylene glycol, 1,3 propanediol or 1,4-butanediol and the dibasic acid component of succinic acid, glutalic acid or adipic acid and has hydroxyl groups at the both terminals. One having a polymerization degree of from 1 to 100 and a molecular weight corresponding to the polyester of from 1,000 to 45,000 is particularly preferable.

Examples of the diisocyanate component constituting the polyester-urethane include a polymethylene diisocyanate such as ethylene diisocyanate, trimethylene diisocyanate, tetramethylene diisocyanate and hexamethylen diisocyanate, an aromatic diisocyanate such as p-phenylene diisocyanate, tolylen diisocyanate, p,p'-diphenylmethane diisocyanate and 1,5-naphthylene diisocyanate, and m-xylylene diisocyanate. Among them, tolylene diisocyanate, m-xylylene diisocyanate and tetramethylene diisocyanate are preferable, because the polyesters rethanized by these diisocyanates are superior in the compatibility with cellulose ester.

The molecular weight of the polyester-urethane is preferably from 2,000 to 50,000, and more preferably from 5,000 to 15,000. The polyester-urethane can be easily synthesized by usual method in which the polyester is mixed with the diisocyanate and heated while stirring. The polyester as the raw material is also easily synthesized by a heat-melt condensation method by polyseterizing reaction or ester exchanging reaction of the dibasic acid or its alkyl ester and the glycol, or an interface condensation method of chloride of such the acid and the glycol, and the reactions are controlled so that the terminal group becomes hydroxyl group.

The adding amount of the polyester-urethane is from 5 to 30% by weight of the principal resin; the film having suitable plasticity can be obtained by the adding amount within the above range.

The polyester is one constituted by polyethylene glycol and an aliphatic dibasic acid and the average molecule weight thereof is preferably from 700 to 10,000.

The polyethylene glycol is represented by the following formula:

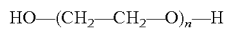

In the above, n is an integer and is preferably not more than 4.

The aliphatic dibasic acid is, for example, formic acid, malonic acid, succinic acid and adipic acid each represented by the following formula:

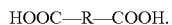

In the above R is an aliphatic divalent hydrocarbon group, and the number of the carbon atom is preferably not more than 9.

The polyester is easily synthesized by a heat-melt condensation method by polyseterizing reaction or ester exchanging reaction of the dibasic acid or its alkyl ester and the glycol, or an interface condensation method of chloride of such the acid and the glycol.

The adding amount of the polyester is from 5 to 30% by weight of the principal resin; the film having suitable plasticity can be obtained by the adding amount within the above range.

As the antioxidant, a hindered phenol compound is suitable. Concrete examples of the compound include 2,6-t-butyl-p-cresol, pentaerythrityl-tetrakis-[3-(3,5-di-t-butyl-4-hydroxyphenyl)propionate], triethylene glycol-bis[3-(3-t-butyl-5-methyl-hydroxyphenyl)propionate], 1,6-hexanediol-bis[3-(3,5-di-t-butyl-4-hydroxyphenyl)-propionate], 2,4-bis-(n-octylthio)-6-(4-hydroxy-3,5-di-t-butylanilino)-1,3,5-triazine, 2,2-thio-diethylene-bis-[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)-benzene and tris-(3,5-di-t-butyl-4-hydroxybenzyl)-isocyanulate. 2,6-di-t-butyl-p-cresol, pentaerythrityl-tetrakis-[3-(3,5-di-t-butyl-4-hydroxyphenyl)propionate] and triethylene glycol-bis[3-(3-t-butyl-5-methyl-hydroxyphenyl)propionate] are specifically preferable. A hydrazine type metal inactivating agent such as N,N'-bis[3-(3,5-di-t-butyl-4-hydroxyphenyl)propionyl]hydrazine and a phosphor type processability stabilizing agent such as tris(2,4-di-t-butylphenyl)phosphite may be employed with together. The adding amount of these compounds for obtaining the effects thereof is preferably from 1 ppm to 1.0%, and particularly preferably from 10 to 1,000 ppm, by weight of the thermoplastic resin.

Examples of the UV absorbent capable of being used in the present invention include an oxybenzophenone type compound, a benzotriazole type compound, a salicylate type compound, a benzophenone type compound, a cyanoacrylate type compound and a nickel complex type compound, and the benzotriazole type compound is preferable which is weak in the coloring. The UV absorbents described in Tokkai Hei 10-182621 and 8-337574 and the polymer UV absorbents described in Tokkai Hei 6-148430 are preferably employed.

As the UV absorbent, ones are preferable which are superior in the UV absorbing ability in the region of not more than 370 nm from the viewpoint of degradation prevention of the polarizing element and the liquid crystal and are low in the absorption of visible light of not less than 400 nm from the viewpoint of displaying ability of the liquid crystal.

Concrete examples of the UV absorbent useful in the present invention include 2-(2'-hydroxy-5'-methylphenyl)-benzotriazole, 2-(2'-hydroxy-3',5'-di-t-butylphenyl)-benzotriazole, 2-(2'-hydroxy-3'-t-butyl-5'-methylphenyl)-benzotriazole, 2-(2'-hydroxy-3',5'-t-butylphenyl)-5-chlorobenzotriazole, 2-(2'-hydroxy-3'-(3",4",5",6"-tetrahydrophthalimidemethyl)benzotriazole, 2,2-methylene-bis(4-(1,1,3,3-tetramethylbutyl)-6-(2H-benzotriazole-2-yl)phenol), 2-(2'-hydroxy-3'-t-butyl-5'-methylphenyl)-5-chlorobenzotriazole, 2-(2H-bezotriazole-2-yl)-6-(straight or branched chain dodecyl)-4-methylphenol and a mixture of octyl-3-[3-t-butyl-4-hydroxy-5-(chloro-2H-benzotriazole-2-yl)phenyl]propionate and 2-ethylhexyl-3-[3-t-butyl-4-hydroxy-5-(5-chloro-2Hbenzotriazole-2-yl)phenyl]propionate, but the UV absorbent is not limited thereto. Tinuvin 109, 171, 326, each put on the market by Ciba Specialty Chemicals are preferably usable.

Concrete examples of the benzophenone type compound include 2,4-dihydroxybenzophenone, 2,2'-dihydroxy-4-methoxybenzophenone, 2-hydroxy-4-methoxy-5-sulfo-benzophenone and bis(2-methoxy-4-hydroxy-5-benzoyl-phenylmethane, but not limited thereto.

The adding amount of these UV absorbents is preferably from 0.01 to 10%, and more preferably from 0.1 to 5%, by weight of the thermoplastic resin. When the adding amount is too small, the effect tends to be insufficient and when the amount is too large, the transparency of the film tends to be degraded. The UV absorbents having high heat stability are preferable.

In the present invention, a fine particle is preferably added to the film for providing slipping ability. The fine particle usable in the present invention may be an inorganic compound or an organic compound as long as they have resistivity to heat on the occasion of the melting. For example, a silicon-containing compound, silicon dioxide, aluminum oxide, zirconium oxide, calcium carbonate, talk, clay, baked kaolin, baked calcium silicate, hydrated calcium silicate, aluminum silicate, magnesium silicate and calcium phosphate are preferable as the inorganic compound, and the silicon-containing compounds and zirconium oxide are more preferable. Among them, silicon dioxide is particularly preferable by which the occurrence of the haze can be inhibited. Concrete examples of preferable silicon dioxide include Aerogil 200V, R972V, R972, R974, R812, 200, 300, R202, OX50 and TT600 in trade name, each manufactured by Nihon Aerogil Co., Ltd. are preferably employed.

An ellipse polarizing plate can be made by pasting the optical film of the present invention onto at least one surface of the polarization film.

The polarization film is usually employed one which is prepared by treating a film capable of being oriented by stretching such as polyvinyl alcohol by a dichromic dye such as iodine and stretching in the length direction. The polarizing plate is usually prepared by pasting non-anisotropic cellulose acetate film onto both sides of the polarizing film as the protective film because the polarizing film is influenced in the strength and the durability. The optical film may be pasted onto the polarizing plate with the protective film or directly onto the polarization film concurrently as a protective film to produce the polarizing plate. The optical film according to the present invention has the slow axis in the lateral direction. Therefore, the optical film can be pasted with the polarization film both in the state of long-length roll so that the product efficiency is considerably raised.

The polarizing plate may be an adhesive type composed of a peelable sheet laminated on the one or both of the surfaces on the polarizing plate through a pressure sensitive adhesive layer such as an acryl type pressure sensitive adhesive layer. The adhesive type polarizing plate can be easily pasted to the liquid crystal cell after peeling off the peelable sheet.

Thus obtained polarizing plate according to the present invention can be applied for various types of display. A liquid crystal display using an AV mode liquid crystal cell is particularly suitable, in which the liquid crystal molecules are vertically oriented when no electric potential is applied.

EXAMPLES

The present invention is concretely described below referring examples, but the present invention is not limited to the examples.

Example 1

| | |
|---|---|
| Cellulose acetate propionate (Acetyl group substitution degree: 1.95, propionyl group substitution degree: 0.7, Number average molecular weight: 75,000, Dried in vacuum for 24 hours at 60° C.) | 100 parts by weight |
| Triphenyl phosphate | 10 parts by weight |
| Ethylphthalylethyl glycol | 2 parts by weight |
| Tinuvin 109 (Ciba Specialty Chemicals CO., Ltd.) | 0.5 parts by weight |
| Tinuvin 171 (Ciba Specialty Chemicals CO., Ltd.) | 0.5 parts by weight |
| Tinuvin 326 (Ciba Specialty Chemicals CO., Ltd.) | 0.3 parts by weight |
| Antioxidant: 2.6-di-t-butyl-p-cresol + pentaerythrytol-tetrakis[3-(3,5-di-t-butyl-4-hydroxyphenyl)propionate] | 0.01 parts by weight |

The above mixture was molten and mixed using the two-axis extruder 21 in FIG. 1 to form pellets. The pellets were molten at 250° C. and extruded through the T-die 24 into a form of film onto the cooling drum 26 held at 30° C. The width of the cooling drum 26 was 1950 mm.

The cooling drum 26 was divided into regions of: (i) each ⅕ of the width from each of the side edges of the film; and (ii) a central region. The temperatures of the above region (i) and region (ii) were each individually controlled. The surface temperature of region (i) (each ⅕ width of the film from the both sides) was controlled at 40° C. using the pipes 2 and 3 of Piping System A, and the temperature of region (ii) (the central region) was controlled at 30° C. using the pipes 4 and 5 of Piping System B. The extruded resin mixture was cooled and solidified to obtain unstretched film having a width of 1750 mm after solidified. The surface temperature of the cooling drum was measured at a position of 1 m apart from the cooling drum by an infrared ray type non-contacting thermometer manufactured by Keyence Corp.

Thus obtained unstretched film was continuously introduced into the tenter stretching machine 29 and stretched by 1.5 times in the lateral direction at 160° C. and cooled by 30° C. while relaxing in 3% in the width. Then, released from the clips and the clipped portions of the film were cut off. Thus a roll of cellulose acetate propionate film having a width of 1,800 mm, a length of 300 m and a thickness of 80 µm was obtained.

The uniformity of the retardation, the in-plane retardation Ro and that the retardation in the thickness direction Rt of the obtained optical film were evaluated by the following method. Besides, Examples 2 and 3 were prepared in the same manner as in Example 1 except that the cooling condition was varied, and the evaluation results of them are listed in Table 1.

Furthermore, Examples 5 to 7 were prepared in the same manner as in Example 1 except that the widths of the cooling roller and the film after solidifying was 2450 mm and 2250, respectively, and that a rolled optical film of cellulose acetate propionate finally had a width of 2,200 mm, a length of 300 m and a thickness of 80. The film was evaluated in the same manner as in Example 1. Obtained results are shown in Table 2.

(Uniformity of Retardation)

Each of the films was observed under crossed nicols and ranked according to the following norms.

A: Permeated light was not observed, and the entire field of vision was uniformly dark.
B: Slightly brightening portion was partially observed.
C: Slightly brightening portion was entirely observed.
D: Brightening portion was partially observed.
E: Brightening portion was entirely observed.

[In-plane retardation Ro and the retardation in the thickness direction Rt]

The retardation in the in-plane direction Ro and in the thickness direction Rt of each of the obtained films were measured at 30 points in the lateral direction and 30 points in the length direction and the average value and the difference of the maximum value and the minimum values of measured results were determined. The results were described in average values.

Three dimensional refractive index was measurement by an automatic birefringence meter KOBRA-21ADH, manufactured by Oji Scientific Instruments, at a wavelength of 590 nm under an atmosphere of a temperature of 23° C. and a relative humidity of 55%, and the refractive index Nx in the slow axis direction and that Ny in the fast axis direction were determined. The retardation in the thickness direction Rt and that in in-plane, direction Ro were calculated by the following equations.

$$Ro=(nx-ny)\times d$$

$$Rt=\{(nx+ny)/2-nz\}$$

In the above, nx is the refractive index in the slow axis, ny is the refractive index in the fast axis direction and d is the thickness of the film in nm.

Comparative Examples

Optical films each having the width of 1,800 mm, a length of 300 m and a thickness of 80 µm were prepared in the same manner as in Example 1 except that the surface temperature of the cooling drum was controlled uniformly in the lateral direction at 30° C. or 40° C. to obtain Comparative Examples 1 and 2, respectively, by unifying the piping systems A and B.

Optical films each having the width of 2,200 mm, a length of 300 m and a thickness of 80 µm were prepared in the same manner as in Example 1 except that the widths of the cooling roller and the film after solidifying was 2450 mm and 2250, respectively, and that the surface temperature of the cooling drum was controlled uniformly in the lateral direction at 30° C. or 40° C. to obtain Comparative Examples 3 and 4, respectively, by unifying the piping systems A and B.

In the same manner as Example 1, the uniformity of the retardation, the in-plane retardation Ro and that the retardation in the thickness direction Rt of each of the Comparative Examples 1 to 4 were evaluated, and the average value of each retardation and the difference between the maximum value and the minimum value of retardation for each sample were determined. The results were summarized in Tables 1 and 2.

TABLE 1

|  | Controlled temperature (° C.) | | Average value (nm) | | Difference between the maximum value and the minimum value of Rt |
|---|---|---|---|---|---|
|  | B | A | Ro | Rt |  |
| Example 1 | 30 | 40 | 55 | 120 | 5 |
| Example 2 | 30 | 35 | 50 | 100 | 6 |
| Example 3 | 35 | 40 | 55 | 125 | 5 |
| Comparative Example 1 | 30 | 30 | 55 | 120 | 18 |
| Comparative Example 2 | 40 | 40 | 55 | 125 | 25 |

TABLE 2

|  | Controlled temperature (° C.) | | Average value (nm) | | Difference between the maximum value and the minimum value of Rt |
|---|---|---|---|---|---|
|  | B | A | Ro | Rt |  |
| Example 5 | 30 | 40 | 55 | 120 | 4 |
| Example 6 | 30 | 35 | 50 | 100 | 5 |
| Example 7 | 35 | 40 | 55 | 125 | 5 |
| Comparative Example 3 | 30 | 30 | 55 | 120 | 25 |
| Comparative Example 4 | 40 | 40 | 55 | 125 | 30 |

The results listed in Tables 1 and 2 clearly displayed that the optical films of the present invention which were prepared by passing the film (web) before stretching on the roller-shaped cooling drum 26 showed entirely uniform dark field of vision without any light permeation when the films were observed under the crossed nicols. Therefore, these films of the present invention were ranked into Rank A which had uniform retardation and could be satisfactorily employed as the optical film.

Contrary to that, the films of comparative examples displayed brightening portion and dark portion were slightly observed in the field of vision when the films were observed under the crossed nicols, and these films were ranked into Rank C. The films were not uniform in the retardation and could not be employed as the optical film.

Example 2

Poly vinyl alcohol having a thickness of 120 μm was immersed in 100 parts by weight of an aqueous solution containing 1 part by weight of iodine and 4 parts by weight of boric acid and stretched for 4 times at 40° C. to prepare a polarization film.

Besides, Konica Minolta TAC having a thickness 80 μm, cellulose triacetate film manufactured by Konica Minolta Opto Inc., was immersed in an aqueous solution of sodium hydroxide having a concentration of 2 moles/liter for 2 minutes at 60° C. and dried for 10 minutes at 100° C. to prepare alkali saponified cellulose triacetate film for the protective film.

Thus obtained polarization film was pasted with the above triacetate film by an adhesive of 5% aqueous solution of completely saponified poly vinyl alcohol so as to prepare a polarizing plate having the protective film on one side thereof.

The optical films obtained in Example 1 were each subjected to corona treatment of 50 dyn/cm and pasted onto the side with no protective layer of the polarization film is provided by a 5% aqueous solution of completely saponified poly vinyl alcohol as the adhesive to prepare a polarizing plate. The pasting was carried out so that the lateral direction of the optical film was parallel to the transparent axis (in the lateral direction) of the polarization film.

The viewing angle was evaluated by the following method using thus obtained polarizing plates. As the result, clear images was observed and the viewing angle was found to be suitable.

{Evaluation of the Viewing Angle Property}

The evaluation of the viewing angle property was carried out by visual observation as follows using a vertical alignment mode liquid crystal cell.

The polarizing plate of a liquid crystal display using a vertical alignment mode liquid crystal cell VL-1530S, manufactured by Fujitsu Co., Ltd., was replace with the polarizing plates prepared as above. The polarizing plate was pasted by an adhesive so that the transparent axis of the polarizing plate on the observer side was in vertical direction and that of the polarizing plate on the backlight side was in horizontal direction. An image displayed on such the liquid crystal display was observed at an angle of 80° to the normal line of the displaying screen. A clear images was observed and the viewing angle was found to be suitable.

As above-described, the optical film having uniform retardation can be provided by the present invention, which is employed as the protective film for preparing the polarizing plate. Consequently, the displaying contrast of the liquid crystal display can be raised and the liquid crystal display having suitable viewing angle can be provided by employing such the polarizing plate.

What is claimed is:

1. A method for producing an optical film comprising the steps of:
    melt casting a cellulose ester resin or a cycloolefin resin by extruding melt of the cellulose ester resin or the cycloolefin resin from a die onto a roll-shaped cooling drum;
    cooling and solidifying the extruded melt to form a film;
    stretching the film in a lateral direction of the film; and
    winding the stretched film in a roll,
    wherein the cooling drum has plural cooling regions divided in an axis direction of the cooling drum, and a surface temperature of each cooling region is independently controlled by different control systems to provide a difference in surface temperature among the plural cooling regions such that a variation in retardation of the stretched film is not more than 15 nm,
    wherein a width of the roll film is 1500 to 4000 mm, and
    wherein the plural cooling regions of the cooling drum constitute a central region and side regions located at both sides of the central region and the surface temperature of the central region is controlled to be lower than that of the side regions, and wherein in the stretching step, a stretching temperature is controlled such that a difference in temperature along the lateral direction of the film is not more than ±2° C.

2. The method of claim 1, wherein the cellulose ester resin comprises at least one compound selected from a group consisting of: cellulose acetate, cellulose propionate, cellulose butyrate, cellulose acetate propionate, cellulose acetate butyrate, cellulose acetate phthalate, and cellulose phthalate.

3. The method of claim 1, wherein the cooling drum is divided into 3 to 10 cooling regions.

4. The method of claim 1, wherein
a width of the cooling drum is larger than the width of the roll film and 4400 mm or less; and
a diameter of the cooling drum is 300 to 3500 mm.

5. The method of claim 1, wherein
a difference in surface temperature between any adjacent cooling regions is 5 to 30° C.; and
a temperature difference between a maximum temperature and a minimum temperature in a surface temperature profile of all over the cooling drum is 5 to 50° C.

6. The method of claim 1, wherein a thickness of the optical film is 40 to 120 μm.

7. The method of claim 1, wherein the different control systems have respective independent cooling lines to send different heat exchanging media separately to the plural cooling regions.

8. The method of claim 7, wherein the different heat exchanging media are different in temperature or heat capacity from each other.

9. The method of claim 1, wherein in the step of melt casting, the temperature of the melt is 200 to 300° C.

10. The method of claim 1, wherein the variation in retardation Rt in the thickness direction of the film is 10 nm or less.

* * * * *